United States Patent
Zhu et al.

(10) Patent No.: US 7,101,635 B1
(45) Date of Patent: Sep. 5, 2006

(54) METHANOL-TOLERANT CATHODE CATALYST COMPOSITE FOR DIRECT METHANOL FUEL CELLS

(75) Inventors: Yimin Zhu, Los Alamos, NM (US); Piotr Zelenay, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 829 days.

(21) Appl. No.: 10/260,780

(22) Filed: Sep. 27, 2002

(51) Int. Cl.
*H01M 8/18* (2006.01)

(52) U.S. Cl. .............................. 429/19; 429/30; 429/33; 429/40; 429/41; 429/44; 502/101

(58) Field of Classification Search ................ 429/30, 429/33, 19, 40, 41, 44
See application file for complete search history.

(56) References Cited

U.S. PATENT DOCUMENTS

| | | | |
|---|---|---|---|
| 4,316,944 A | 2/1982 | Landsman et al. ............ 429/44 |
| 5,876,867 A | 3/1999 | Itoh et al. ..................... 429/44 |
| 6,066,410 A | 5/2000 | Auer et al. .................. 429/40 |
| 6,300,000 B1 | 10/2001 | Cavalca et al. .............. 429/40 |
| 6,635,369 B1 * | 10/2003 | Uribe et al. .................. 429/13 |
| 6,861,387 B1 * | 3/2005 | Ruth et al. .................. 502/184 |

* cited by examiner

*Primary Examiner*—Bruce F. Bell
(74) *Attorney, Agent, or Firm*—Mark N. Fitzgerald; Ray G. Wilson

(57) ABSTRACT

A direct methanol fuel cell (DMFC) having a methanol fuel supply, oxidant supply, and its membrane electrode assembly (MEA) formed of an anode electrode and a cathode electrode with a membrane therebetween, a methanol oxidation catalyst adjacent the anode electrode and the membrane, an oxidant reduction catalyst adjacent the cathode electrode and the membrane, comprises an oxidant reduction catalyst layer of $Pt_3Cr/C$ so that oxidation at the cathode of methanol that crosses from the anode through the membrane to the cathode is reduced with a concomitant increase of net electrical potential at the cathode electrode.

4 Claims, 4 Drawing Sheets

METHANOL-TOLERANT CATHODE CATALYST COMPOSITE FOR DIRECT METHANOL FUEL CELLS

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to direct methanol fuel cells, and, more particularly, to cathode catalyst composites for direct methanol fuel cells.

BACKGROUND OF THE INVENTION

Fuel cells are considered a possible alternative to direct combustion engines to power transportation vehicles and to possibly furnish electrical energy to a power distribution grid for home and business use. In a fuel cell, fuels are chemically reacted with an oxidant whereby a direct current is produced at a low voltage across individual cells and stacks of cells are formed to produce useful voltages. Catalyst materials promote the chemical reactions of the fuels (typically hydrogen or methanol) and oxidant (typically pure oxygen or air).

In a generic embodiment shown in FIG. 1, a fuel cell 10 includes an anode electrode 14 for the fuel oxidation, a cathode electrode 16 for the oxidant reduction, and a solid state polymer electrolyte membrane 18 therebetween to provide an ionic conduction path. The combination of anode electrode 14, cathode electrode 16, and membrane 18 is conventionally called a membrane electrode assembly (MEA) 12. A suitable catalyst is disposed adjacent the interfaces of electrode/membrane surfaces 14/18 and 16/18 so that the fuel is oxidized at the anode/membrane interface 14/18 to produce ions that traverse the membrane to complete the oxidant reduction at the cathode/membrane interface 16/18. Fuel 24 is distributed over anode 14 of MEA 12 by fuel distribution plate 22 and unreacted fuel and reaction products 26 are exhausted. Oxidant 32 is distributed over cathode 16 of MEA 12 by oxidant distribution plate 28 and excess oxidant and reaction products 34 are exhausted. As a result, electrons generated at anode 14 travel through an external circuit (not shown) back to cathode 16. The electrons constitute the flow of electrical current that provides energy to components connected to the external circuit.

The most common fuel used in the development of polymer electrolyte membrane fuel cells has been hydrogen, either in a pure form or furnished as a reformate from hydrocarbon products. Yet another approach is to directly use a liquid methanol solution in direct methanol fuel cells (DMFCs) to avoid the complications associated with supplying pure hydrogen or providing a separate system for reforming hydrocarbons to provide reformated hydrogen. DMFCs with a solid polymer electrolyte can provide high current density at low temperature and have a relatively simple fuel cell construction. Methanol is a renewable fuel material and can be readily transported and supplied with existing transportation and distribution infrastructure for liquid fuels. Both hydrogen fuel cells and DMFCs have the generic structure shown in FIG. 1.

In a DMFC, catalysts promote electrode reactions at the cathode and the anode, where a metric of performance is the catalytic activity per unit mass of catalytic metal. This metric is directly related to the efficiency and output power of the cells and to the manufactured cost of the cells. Platinum black was an early cathode catalyst in an ion-exchange MEA for hydrogen fuel cells, typically a gas diffusion electrode substrate with one surface coated with platinum black in an amount of 4 to 10 mg cm$^{-2}$ of the MEA.

To improve the utilization efficiency of platinum, a catalyst was developed with platinum or a platinum alloy supported on conductive carbon, which was mixed with an ion-exchange polymer, coated on an electrode substrate, and joined to an ion-exchange membrane by painting, hot pressing, or the like, to form the MEA. This process permitted the thickness and composition of the catalyst layer to be controlled so that the catalyst was more effectively utilized in the electrode reaction. A loading of platinum or platinum alloy of only 0.1 to 1.0 mg cm$^{-2}$ was needed to produce a performance equivalent to prior art hydrogen fuel cells.

This reduced loading that has been demonstrated for hydrogen fuel cells has not been achieved, however for DMFCs. In a DMFC, some methanol crosses through the membrane from the anode and reacts at the cathode, competing with the oxygen reduction reaction for active catalyst surface sites. Reducing the catalyst loading results in fewer active sites available for the oxygen reduction reaction, as well as limiting the ability of the catalyst to handle methanol crossover, with a concomitant reduction in the potential of the DMFC cathode. Thus, methanol crossover to the cathode not only lowers fuel utilization, but also adversely affects the oxygen cathode with overall lower cell performance.

One way to reduce the effect of methanol crossover on DMFC performance is to simply reduce methanol crossover by developing a membrane that is less permeable to methanol; but this has not been achieved. Other ways to reduce methanol crossover include lower methanol feed concentration and optimized cell design.

The present invention recognizes that performance losses associated with methanol crossover arise from the fact that most Pt-based cathode systems are catalytically active to methanol oxidation under normal cell operating conditions with a resulting net cathode potential from oxygen reduction reaction potential reduced by the methanol oxidation reaction. In accordance with the present invention, a Pt-alloy catalyst has been identified that is less catalytically active for methanol oxidation, while having equal or increased catalytic activity for oxygen reduction.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a direct methanol fuel cell (DMFC) having a methanol fuel supply, oxidant supply, and a membrane electrode assembly (MEA) formed of an anode electrode and a cathode electrode with a solid polymer electrolyte membrane therebetween, a methanol oxidation catalyst adjacent the anode electrode and the membrane, an oxidant reduction catalyst adjacent the cathode electrode and the membrane, wherein the improvement comprises an oxidant reduction catalyst layer of Pt$_3$Cr/C so that oxidation at the cathode of methanol that crosses from the anode through the membrane to the cathode is reduced with a concomitant increase of net electrical potential at the cathode electrode.

In one embodiment, the PtCr/C catalyst is supplied at a loading less than 1 mg cm$^{-2}$ and the cathode catalyst layer includes a perflourinated ion exchange polymer in a volume percent between 35% and 55%.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

In accordance with the present invention, a cathode catalyst of carbon supported Pt$_3$Cr (Pt$_3$Cr/C) provides reduced catalytic activity for methanol reaction at a DMFC cathode while maintaining or increasing catalytic activity for the oxygen reduction reaction at the cathode. The net potential at the cathode from the methanol oxidation and oxygen reduction is increased over the net potential obtained from a conventional carbon supported Pt (Pt/C) cathode catalyst.

Figure 1:
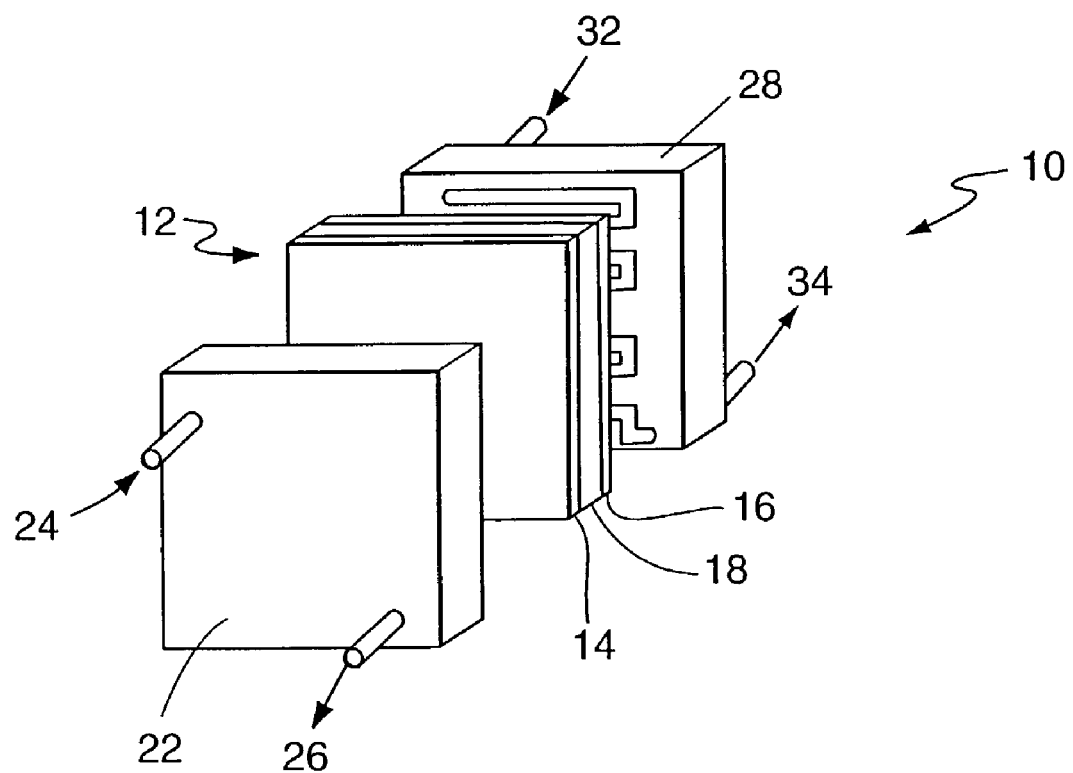
FIG. 1 pictorially depicts the component parts of a fuel cell having functions described herein.

A suitable DMFC has the functional fuel cell structure shown in FIG. 1. It will be appreciated that each structural element shown in FIG. 1 can be implemented in a variety of structures known to those skill in the art, except was specifically described herein to incorporate the Pt$_3$Cr/C cathode catalyst.

As shown below, we have demonstrated that improved DMFC performance is obtained with a Pt$_3$Cr/C cathode catalyst compared to a Pt/C cathode catalyst. In these comparative experiments, the Pt$_3$Cr/C catalyst was about 44 wt % Pt$_3$Cr and the Pt/C catalyst was about 40 wt % Pt. The anode catalyst was a PtRu black or PtRu/C (45 wt %). The anode and cathode catalysts were dispersed in appropriate amounts in water, with an added perflourinated ion exchange polymer for ionic conduction adjacent the catalysts (e.g., 5% Nafion® solution (1100 EW, Solution Technology, Inc., USA). Exemplary cathode ink compositions were 65 wt % Pt/C and 35 wt % Nafion and 66 wt % Pt$_3$Cr/C and 34 wt % Nafion; anode ink compositions were 85 wt % PtRu and 15 wt % Nation or 70 wt % PtRu/C and 30 wt % Nafion. MEAs were prepared by painting the catalytic inks on membranes of Nation 117®. The desired catalyst loadings are less than about 1.0 mg cm$^{-2}$ so the cathode catalyst inks were applied to obtain an experimental loading of about 0.6 mg cm$^{-1}$. In all cases the geometric active area of the MEA was 5 cm$^2$.

TABLE 1

Preferred composition of catalyst layers

| Catalyst | Catalyst (wt %) | Nafion ® (wt %) |
|---|---|---|
| PtRu black | 85 | 15 |
| PtRu/C | 70 | 30 |
| Pt/C | 65 | 35 |
| Pt$_3$Cr/C | 66 | 34 |

Figure 2:
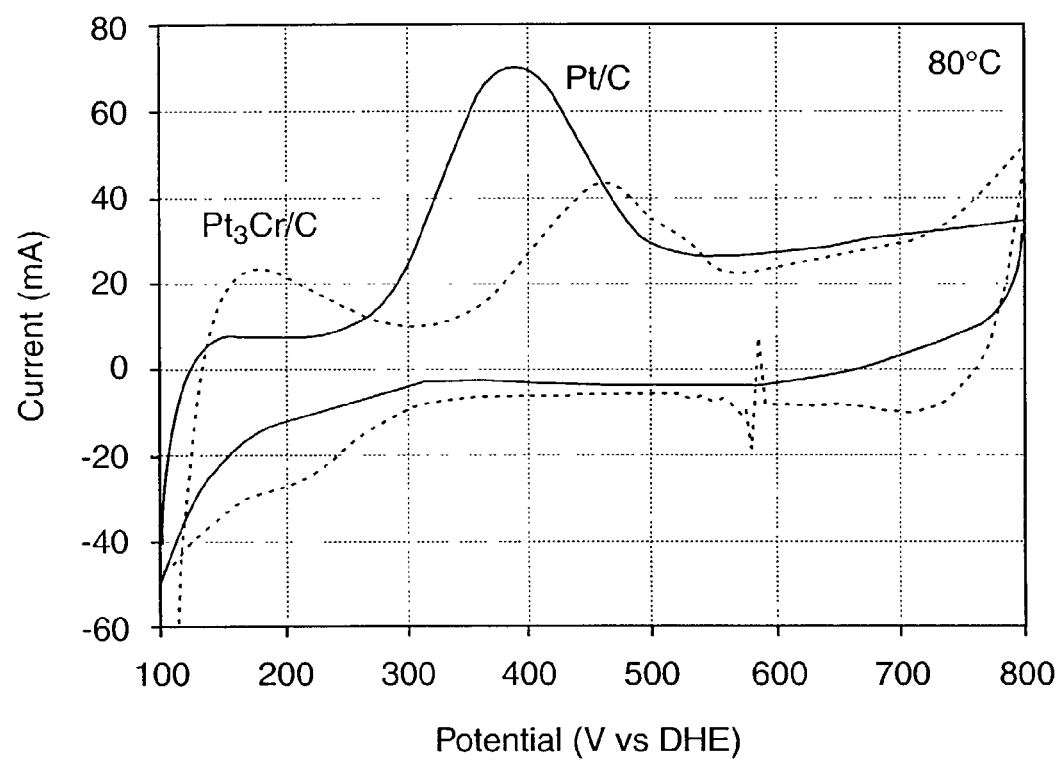
FIG. 2 graphically depicts CO stripping voltammograms for Pt$_3$Cr/C and Pt/C catalysts to illustrate the low catalytic activity of Pt$_3$Cr/C for methanol oxidation relative to Pt/C.

The reduced catalytic activity of Pt$_3$Cr/C for methanol oxidation compared to Pt/C is demonstrated by the CO stripping voltammograms shown in FIG. 2 for a Pt loading of 0.6 mg cm$^{-2}$ in both cases. To obtain these results, DMFCs with Pt$_3$Cr/C cathode catalyst and with Pt/C cathode catalyst were operated in a "driven mode", with methanol being oxidized at the fuel cell cathode and hydrogen evolving at the fuel cell anode, which acted as a counter/quasi-reference electrode (a dynamic hydrogen electrode, DHE). CO produced during the methanol oxidation was adsorbed onto the electrode surface and then stripped to determine the surface charge density as a measure of catalytic activity. The charge density for surface CO stripping on the Pt$_3$Cr/C cathode was 33 mC cm$^{-2}$ compared with ~67 mC cm$^{-2}$ for the Pt/C cathode. These results clearly indicate a reduced catalytic activity of Pt$_3$Cr/C for methanol oxidation compared with Pt/C.

Another indication of different activity of methanol towards Pt$_3$Cr/C and Pt/C was obtained in direct measurements of methanol crossover. In these experiments, the cells were again operated in a driven mode, with methanol oxidized at the fuel cell cathode and hydrogen evolved at the fuel cell anode, thereby serving as a hydrogen counter/quasi-reference electrode. After stabilizing the cell at open voltage, a single voltammetric scan was applied to the fuel cell cathode and current response recorded, typically in the range of 0.1–0.6 V. In addition to allowing the magnitude of crossover to be directly examined, the activity of the catalyst towards methanol could also be determined in such an experiment from the kinetic part of the current-potential plots.

Figure 3:
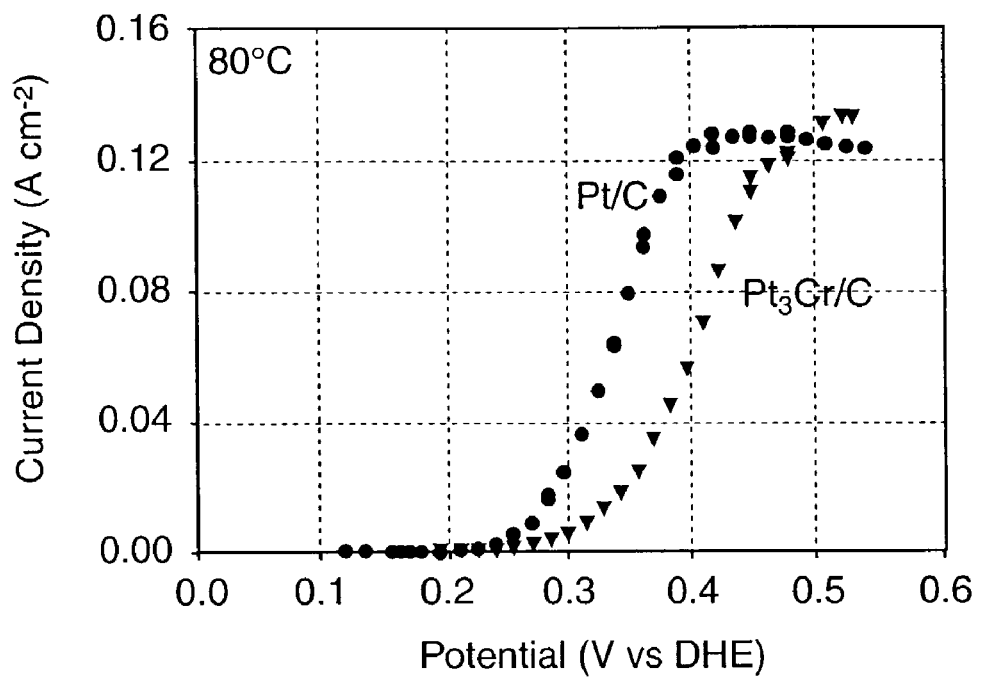
FIG. 3 graphically depicts polarization plots representing electro-oxidation of crossover methanol at Pt$_3$Cr/C and Pt/C electrodes to further demonstrate the relatively low catalytic activity of Pt$_3$Cr/C for methanol oxidation.

As shown by the plots in FIG. 3, the regular Pt/C cathode catalyst is significantly more active towards methanol crossing through the Nafion 117® membrane than the Pt$_3$Cr/C catalyst. For example, at an anode potential of 0.35 V, a typical DMFC operating potential, the current density of methanol oxidation at Pt$_3$Cr/C catalyst is about 20 mA cm$^{-2}$, much lower than that of 81 mA cm$^{-2}$ obtained with the Pt/C catalyst. Not surprisingly, the differences in the rate of methanol oxidation disappear once limiting-current conditions are reached on both electrodes, i.e. at a potential higher than 0.5 V. The same current density of ~130 mA cm$^{-2}$ is measured in either case, thus attesting to the expected similar permeation rates of methanol through the Nafion 117® membrane used with both Pt$_3$Cr/C ands Pt/C cathode catalysts. However, at lower potentials, the cathode using the Pt$_3$Cr/C catalyst that is less sensitive to methanol is expected to remain at a higher net potential than the Pt/C cathode, which is more susceptible to becoming depolarized by methanol.

Figure 4:
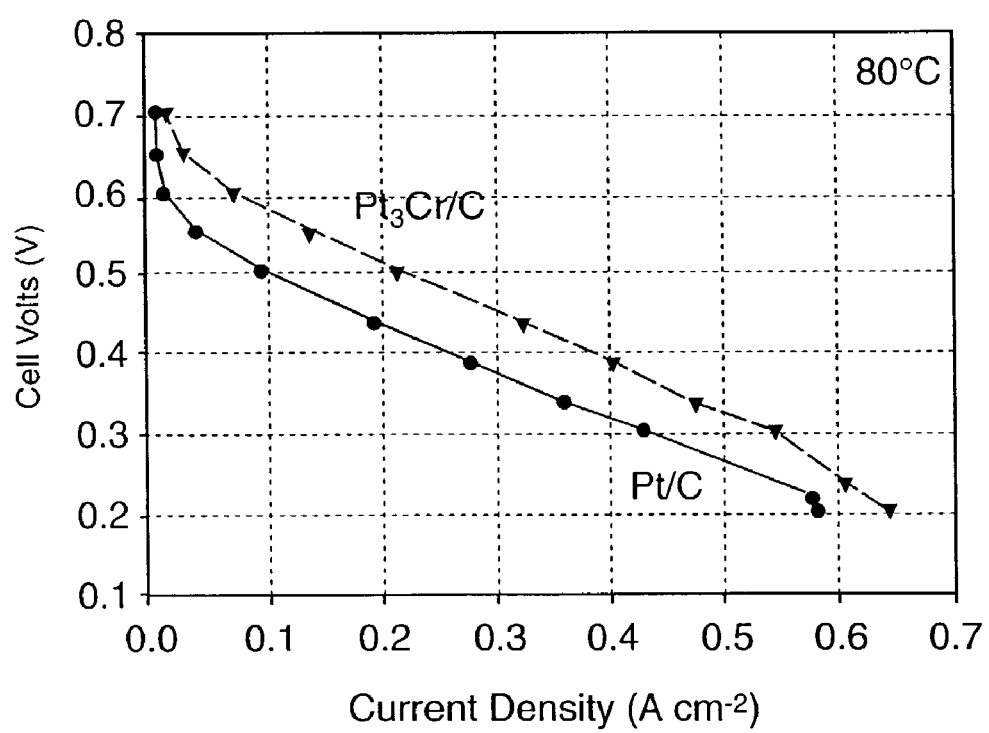
FIG. 4 graphically compares the performance of two DMFCs, one with a Pt$_3$Cr/C cathode and the other with a Pt/C cathode.

FIG. 4 graphically compares the performance of a DMFC with Pt$_3$Cr/C cathode catalyst and a DMFC with Pt/C catalyst. The cathode catalyst loadings were 0.6 mg cm$^{-2}$, the anode catalyst loadings were 9.6 mg cm$^{-2}$ of PtRu black.

The cells were operated at 80° C., cathode pressure of 2.7 atm, with an anode feed of 0.5 M methanol. Except for the lowest current density range, below about 20 mA cm$^{-2}$, where performance of both catalyst composites is dominated by the high flux of methanol through the Nafion membrane, the Pt$_3$Cr/C catalyst consistently showed a 70–80 mV voltage advantage over the reference Pt/C catalyst. This surprisingly large voltage advantage of the Pt$_3$Cr/C catalyst has not been observed in hydrogen fuel cells, although a small voltage advantage is realized by Pt$_3$Cr/C because of a higher activity of the catalyst in oxygen reduction at a cathode.

Relative performance of the two cathode catalysts was also tested versus anodes prepared by using carbon-supported PtRu catalyst at a low loading of ~1.0 mg cm$^{-2}$. Three different MEAs using Pt$_3$Cr/C cathode and PtRu/C anode were made to test reproducibility of the results obtained with the novel cathode catalyst formulation. Hydrogen-air cell polarization plots were then recorded as initial tests of cathode activity at a cell temperature of 80° C., showing very good and reproducible cathode performance. In particular, a cell current density of 0.2 A cm$^{-2}$ was reached at 0.83–0.84 V, i.e. at a cell voltage similar to that measured with highly loaded (9.6 mg cm$^{-2}$) unsupported PtRu anode.

Figure 5:
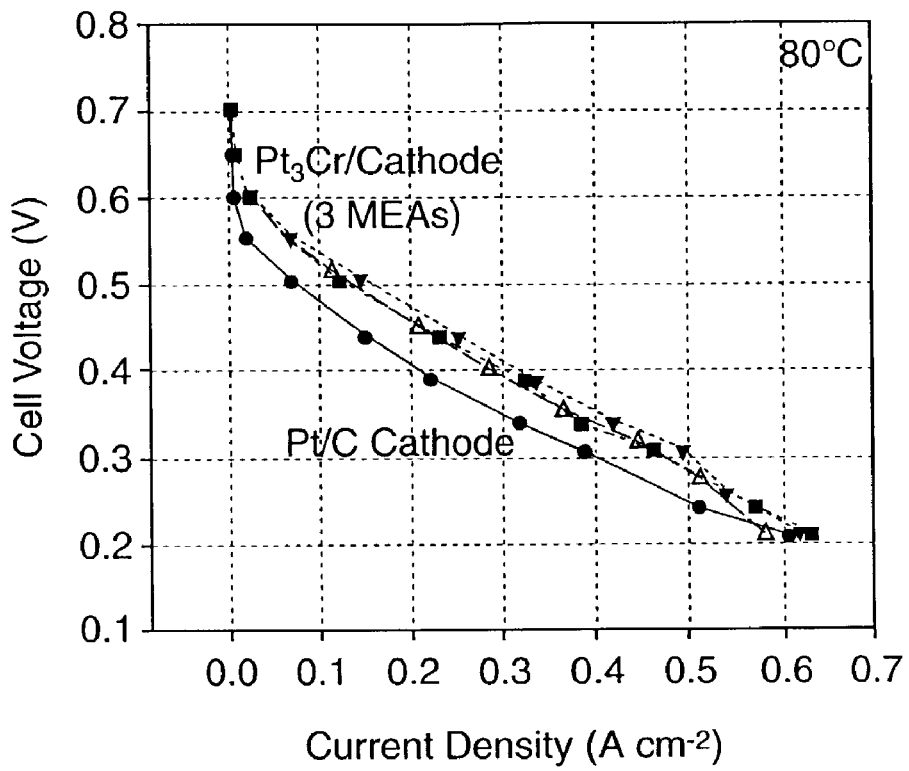
FIG. 5 graphically compares the performance of three (3) DMFCs with MEAs using Pt$_3$Cr/C with one MEA using Pt/C to illustrate performance improvement consistency.

Following operation in hydrogen-air mode, the above cells underwent regular DMFC testing. Polarization plots for the cells with Pt$_3$Cr/C and Pt/C cathodes and PtRu/C anodes at 80° C. are shown in FIG. 5. All plots represent MEAs having the same catalyst loading and operated under the same fuel cell operating conditions. FIG. 5 shows again the very significant performance advantage of Pt$_3$Cr/C catalyst over the reference PVC catalyst. As in the testing performed with highly loaded PtRu anodes, the voltage advantage offered by Pt$_3$Cr/C catalyst over regular Pt/C catalyst with low PtRu/C anode loadings (~1.0 mg cm$^{-2}$) was 60–80 mV in the entire range of investigated cell current densities. The results obtained with three different Pt$_3$Cr/C cells were highly reproducible, with current densities remaining within just a few percent from one another, as further shown in FIG. 5.

To further verify the repeatable nature of the results, different preparation batches (OMG) of the cathode catalyst and a catalyst from another manufacturer (E-TEK) were prepared and tested. Methanol-air polarization plots indicate that there is no significant difference between these catalysts over the total current density region.

Figure 6:
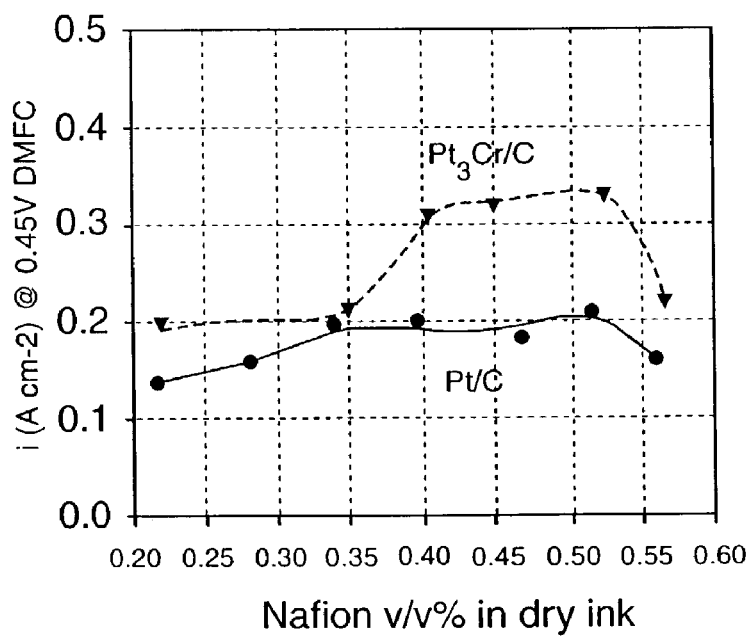
FIG. 6 graphically compares the performance effect of Nafion content in the catalyst layer for Pt$_3$Cr/C and for Pt/C.

In the cathode catalyst layer, an optimal ion-exchange polymer content should minimize both ohmic and mass transport limitations, maximize electrochemical activity and Pt utilization. The influence of polymer content in the catalyst layer with Pt/C or PtCr/C on performance of methanol/air fuel cell is shown in FIG. 6. An increase in Nafion® content improves the performance up to 35% or 40% for Pt/C or Pt$_3$Cr/C, respectively, but Pt$_3$Cr/C catalyst shows a significantly greater performance improvement than does Pt/C. However, when too much polymer (beyond ca. 52%) is introduced the current density at 0.45 V decreases because the ohmic and mass transport limitations appear. This is a reasonable result because the ca. 52% Nafion content means that the volume of Nafion® in the catalyst layer is almost the same as that of the catalyst. It is obvious that Pt$_3$Cr/C is much sensitive to the polymer content.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A direct methanol fuel cell (DMFC) having a methanol fuel supply, oxidant supply, an anode electrode and a cathode electrode with a solid polymer electrolyte membrane therebetween forming a membrane electrode assembly, a methanol oxidation catalyst adjacent the anode electrode and the membrane, an oxidant reduction catalyst adjacent the cathode electrode and the membrane, wherein the improvement comprises an oxidant reduction catalyst layer of Pt$_3$Cr/C that includes a perflourinated ion exchange polymer at about 35 to 55 volume percent of the layer, so that oxidation at the cathode of methanol that crosses from the anode through the membrane to the cathode is reduced with a concomitant increase of net electrical potential at the cathode electrode.

2. The DMFC of claim 1, where the Pt$_3$Cr/C is provided at a loading less than about 1.0 mg cm$^{-2}$.

3. A membrane electrode assembly (MEA), having an anode electrode, a cathode electrode with a solid polymer electrolyte membrane therebetween, for use in a direct methanol fuel cell (DMFC), further including a methanol oxidation catalyst adjacent the anode electrode and the membrane, an oxidant reduction catalyst adjacent the cathode electrode and the membrane, wherein the improvement comprises an oxidant reduction catalyst layer of Pt$_3$Cr/C that includes a perflourinated ion exchange polymer at about 35 to 55 volume percent of the layer, so that oxidation at the cathode of methanol that crosses from the anode through the membrane to the cathode is reduced with a concomitant increase of net electrical potential at the cathode electrode.

4. The MEA of claim 3, where the Pt$_3$Cr/C is provided at a loading less than about 1.0 mg cm$^{-2}$.

* * * * *